United States Patent Office 3,310,408
Patented Mar. 21, 1967

3,310,408
MONOGLYCERIDE EMULSIFIER AND METHOD OF MAKING SAME
Francis Frederick Hansen, 224 E. Poplar St., Walla Walla, Wash. 99362
No Drawing. Filed Oct. 14, 1965, Ser. No. 496,171
5 Claims. (Cl. 99—118)

This invention is for an improvement in a monoglyceride emulsion and the method of preparing it disclosed in my copending allowed application Ser. No. 172,100, filed Feb. 9, 1962, now Patent 3,216,829 granted Nov. 9, 1965, of which this application is a continuation-in-part.

In my said application I have disclosed an aqueous emulsion of a monoglyceride of a fat-forming fatty acid in which distilled monoglyceride of an edible fat-forming fatty acid is combined with about twice its weight of water into a creamy paste-like dispersion that is more effective as an emulsifier for bread and baked goods especially, as well as for use in other edible products, than the distilled monoglyceride itself, or shortenings embodying the monoglyceride. I have also disclosed in said application the substitution of glycerine and/or corn syrup for part of the water, these substitutes providing qualities to the dispersion, which at first appeared to be humectant qualities, but these substances appear to give to the dispersion some other qualities, perhaps in controlling the minute crystal structure of the monoglyceride, which make their use desirable, so that I shall term them modifiers.

While the product so formed has excellent qualities, I have found that its shelf-life is not uniformly good, and while there have been instances where the product has been used after many months, there is frequently a change which is almost visually imperceptible, but wherein the water apparently bleeds out and evaporates, causing the tiny monoglyceride particles to lump together or form small clusters. As a result, the product does not then have the smooth spreading qualities characteristic of the dispersion when it is first formed, and therefore its effectiveness is diminished in baking tests, although still superior to most commercial emulsifiers.

I have subsequently endeavored to find some method of stabilizing the emulsion from aging to assure a uniformly acceptable shelf or storage life; in other words, to produce the same fine results after several months that it has when it is first made. Such method necessarily had to comply with food and drug regulations of the Department of Health and Welfare, and at the same time should not impair the effectiveness of the emulsified monoglyceride.

I have found that by the introduction of pectin into the emulsion, the shelf life of the emulsion for many months without substantial deterioration is assured, and that the resulting product as determined by compressibility tests made with bread is not adversely affected to any great extent, and is considerably better than where the emulsion is prepared without pectin.

The monoglyceride as referred to herein is a concentrated or distilled monoglyceride of an edible fat-forming fatty acid. Commercially it has 80% and usually 90% or more of monoglyceride with the remainder entirely or substantially entirely diglyceride and triglyceride. It is normally a solid at room temperature and the fatty acid moiety has from 12 to 22 carbon-atoms, more often 16 to 18 carbon-atoms. Commercially it is derived from lard or from vegetable seeds, such as soya beans, cotton seed, etc., and it generally comprises mixtures of monoglyceride and two or more fat-forming fatty acids.

The pectin is fruit pectin. It is derived either from apples or citrus fruit and is available commercially in a dry powdery or granulated form, or as a thick liquid preparation, the most common brand of the liquid preparation being available under the name "Certo." Certo is a liquid containing pectin, water, citric acid and lactic acid and a mold retardant. The water content is about 90%, and I believe that it contains pectin in the ratio of 2.88% of pectin to all other ingredients. One percent to about one and one-quarter percent of dry pectin powder relative to the total weight of water is for the present invention about the equal of "Certo" in the following examples, and experiments bear this out, but for small batches "Certo" is easier to use, especially since the pH is not critical.

*Example I*

3 oz. of water were heated in a receptacle to 200° F.
At the same time 3 oz. of distilled monoglyceride was also heated in another vessel to 200° F. The monoglyceride so heated was derived from hydrogenated cotton seed oil and the material used comprised at least 90% monoglyceride with the balance being di-glyceride and tri-glyceride. This product is sold commercially under the name "Myverol," and is a solid at room temperature.

In a third vessel a mixture of 1½ oz. of "Certo" as above described and 1½ oz. of water was heated to 200° F., care being taken to replace with 200° F. water any of the original weight lost by evaporation. I calculate that this is the equivalent of 1.23 grams of pectin powder.

First the heated water and heated monoglyceride were combined in a mixing bowl which had been preheated to 200° F., the monoglyceride being poured into the water while stirring the same, and a gel was instantly formed which was beaten with an electric household kitchen beater at 1000 r.p.m. for three minutes, forming a white, creamy emulsion.

The contents of the third vessel containing water and "Certo" were then rapidly added and beating was continued until the mixture was at about 75° F. This was a period of about forty minutes. The resulting product was a stable emulsion having a consistency comparable to cosmetic cold cream.

About two months later a sample so prepared was turned over to a commercial cereal chemist, and incorporated in a commercial dough mix, the amount of the emulsifier known only to the laboratory as product "I-K," and compressometer tests made from the end of the third day over a period of five days to determine the rate of staling showed a variation of only about 6 points between the beginning and end of the five-day test period. Those skilled in the art recognize this as indicating an exceptionally low rate of staling.

It will be noted that the total weight of the ingredients is 9 oz., with the monoglyceride being one-third of the total, the greatest weight comprising water. The pectin is about 1% to 1¼% the weight of the water.

*Example II*

3 oz. of water are heated in one vessel to 200° F.
3 oz. of the monoglyceride are heated to 200° F. in another vessel.
3 oz. of glycerine are heated to 200° F. in a third vessel.
3 oz. of "Certo" are heated in a fourth vessel to 200° F.
The contents of the first two vessels are combined in a mixing bowl, preheated to 200° F., the monoglyceride being introduced into the water while stirring the mix, and the resulting gel is beaten with a Sunbeam electric kitchen beater as in Example I for three minutes at 1000 r.p.m., then the glycerine was added and beating continued for a further period of three minutes at the same rate, after which the "Certo" was added and beating continued for 15 minutes when the temperature of the mixture was around 100° F. As in Example I, the finished material was a smooth white cream resembling in appearance cosmetic cold cream.

It, too, was tested in bread by the same procedure, and the compressometer tests were about the same as with Example I.

Products made both with glycerine and without glycerine have uniformly good keeping qualities. Corn syrup may be substituted in either formula for all or part of the glycerine, but it is important that the monoglyceride and about an equal weight of water be first heated and mixed to form an initial gel and then beaten before other ingredients are added.

*Example III*

A creamy emulsion was prepared substantially as described above, but instead of using "Certo" there was used 3 oz. of water heated to 200° F. to which had been added 4 grams of powdered citrus pectin. As a further procedure such a mix of monoglyceride and pectin solution was beaten in the mixer for only six minutes after adding the water and pectin, and then the creamy mix was placed in a shallow pan and rapidly chilled for one hour, then placed in a bottle and submitted to a laboratory for testing. The product showed good results when used in bread with highly favorable compressometer tests. This indicated that the beating time may be shortened if the emulsion is rapidly chilled. The pectin is on the high side, being about 4.75% of the weight of the monoglyceride or 2.375% of the total weight of the water and about 2.5 grams is more desirable.

In any of the foregoing examples using glycerine, an equivalent weight of corn syrup may be used, or mixtures of corn syrup and glycerine may be used in any proportion. The modifier is in effect a substitute for an equivalent weight of water in the final mix, but cannot be used in the first stage of mixing, since it interferes with proper initial gel formation, but in the final mix less water is used than where no such modifier is provided. While the amount of modifier is not too critical, an amount less than about one-half the weight of the monoglyceride has little apparent effect, and an amount exceeding substantially the weight of the monoglyceride displaces the amount of water which can be used. Water is of great importance to the effective functioning of the emulsion in baking.

I have found that if too much pectin is used the emulsion becomes too stiff to be easily spread or mixed through the dough. As far as I can determine, for use in baking bread the pectin should not be less than 0.25% the weight of the water in the mixture, and should not exceed about 2.5% or the product on aging becomes too stiff. For some purposes this stiffness may be desirable, in which case more pectin could be used.

My original application Ser. No. 172,100 above mentioned, discloses the manner of using the emulsion in baking, and insofar as it is applicable, is incorporated herein by reference. I have also discovered that hydroxylated lecithin alone or with sodium bicarbonate may be used in place of pectin to stabilize a monoglyceride-water dispersion, as disclosed in a companion application Ser. No. 496,172, filed Oct. 14, 1965.

In my original application, the total weight of water that could be used was about twice the weight of monoglyceride. I have found that by using pectin, or by using hydroxylated lecithin, the ratio of water or water substitute to monoglyceride may be increased, apparently because with the use of these substances the water, instead of the monoglyceride, becomes the continuous phase of the emulsion, and this is desirable, particularly in baking bread. The emulsion can be made as fluid as milk, if this should be desirable, but ordinarily the economics of distribution of the emulsion commercially to the baking industry require that the product have a non-flowing creamy consistency at room temperature, so that the amount of water, or water and modifier, is limited to a range where the emulsion is a substantially non-flowing paste or of a cosmetic cold cream-like consistency.

A ratio of about four parts by weight of water, or water and modifier combined, is about the maximum to avoid an emulsion which is too soft, and as the volume of liquid is increased, more of the emulsion must be used to provide an equivalent concentration of monoglyceride, so that for this reason a higher ratio of water, or water and modifier to one part monoglyceride is of no practical value for most commercial purposes.

While I have stressed the utility of the emulsion for use in bread, it may also be used in lieu of monoglyceride in confections, ice cream and other foods.

I claim:

1. The method of preparing a stable emulsion of monoglyceride and water which comprises
   (a) heating to about 200° F. a distilled monoglyceride of fat-forming fatty acid, which monoglyceride is normally a solid at room temperature,
   (b) separately heating to about 200° F. water, the weight of which is not less than the weight of the monoglyceride or substantially greater,
   (c) separately heating to about 200° F. a volume of water in which is dissolved fruit pectin,
   (d) combining the water first named and the monoglyceride by introducing the monoglyceride into the water and beating the resulting gel into a creamy mass,
   (e) then adding the pectin solution rapidly while the beating continues, and
   (f) continuing the beating until the mixture has cooled to a level approximately 100° F., the solution of water and pectin being sufficient that the weight of the pectin calculated as a dry powder is in the range of 0.25% to 2.5% of the weight of the total water in the mix.

2. The method of preparing an emulsion as defined in claim 1 wherein a modifier selected from the group consisting of glycerine and corn syrup and mixtures thereof is heated to 200° F. and incorporated into the mixture after the first water and monoglyceride are combined and before substantial cooling of the mix has occurred, and the combined weight of water and modifier is at least twice but not more than four times the weight of the monoglyceride and the pectin is in the range of 0.25% and 2.5% of the combined weight of the water and modifier.

3. The method defined in claim 2 in which the weight of the modifier does not substantially exceed the weight of the monoglyceride and the total ratio of water and modifier combined in the finished product is at least twice the weight of the monoglyceride but not substantially in excess of four times the weight of the monoglyceride, and the pectin ranges between 0.25% and about 2.5% the weight of the water and modifier combined.

4. A white creamy emulsion comprising distilled monoglyceride of a fat-forming fatty acid which is normally solid at room temperature, water, fruit pectin and a modifier selected from the group consisting of corn syrup, glycerine and mixtures thereof all combined in substantially the following proportions:

| | |
|---|---|
| Monoglyceride | 3 ozs. |
| Water | 3 ozs. to 12 ozs. |
| Modifiers | 0 to 3 ozs. |
| Pectin calculated as a solid | 1% to 2.5% of the combined weight of the water and modifier. | and wherein the combined weight of the water and modifier does not exceed about four times the weight of the monoglyceride and the modifier does not exceed the weight of the monoglyceride and does not exceed the weight of the water, said emulsion being the product of first adding monoglyceride heated to about the boiling point of water to an equal amount of water similarly heated while beating the same to form an initial white creamy dispersion, and then while continuing the beating and before substantial cooling introducing additional water and pectin also similarly heated, and adding the modifier in the selected range also similarly heated and while the beating continues.

5. A creamy white emulsion consisting principally of monoglyceride normally solid at room temperature of a fat-forming fatty acid, water and fruit pectin in which there is included a modifier selected from the group consisting of corn syrup and glycerine and mixtures thereof, the combined weight of water and modifier being at least twice the weight of monoglyceride but being insufficient to reduce the emulsion to a flowable consistency, the pectin being in the range of .25% and about 2.5% of the combined weight of the water and modifier.

References Cited by the Examiner

UNITED STATES PATENTS

| | | |
|---|---|---|
| 1,625,641 | 4/1927 | Douglas et al. |
| 3,216,829 | 11/1965 | Hansen _____ 99—118 |

OTHER REFERENCES

Eastman Kodak Co., "Myverol Distilled Monoglycerides-Monoglyceride Gels," pp. 1 to 3, Rochester, N.Y.

A. LOUIS MONACELL, *Primary Examiner.*

M. W. GREENSTEIN, *Assistant Examiner.*